April 14, 1970     J. C. PENNOCK ET AL     3,506,057
METHOD OF MAKING DIES AND MOLDS
Filed April 17, 1967     2 Sheets-Sheet 1
FIG.1
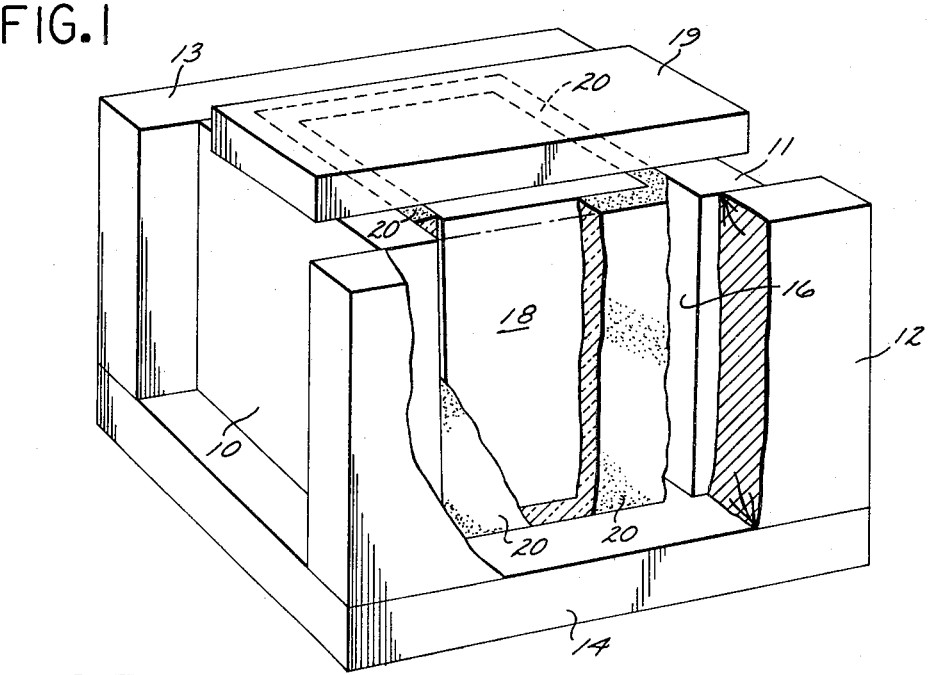
FIG.3
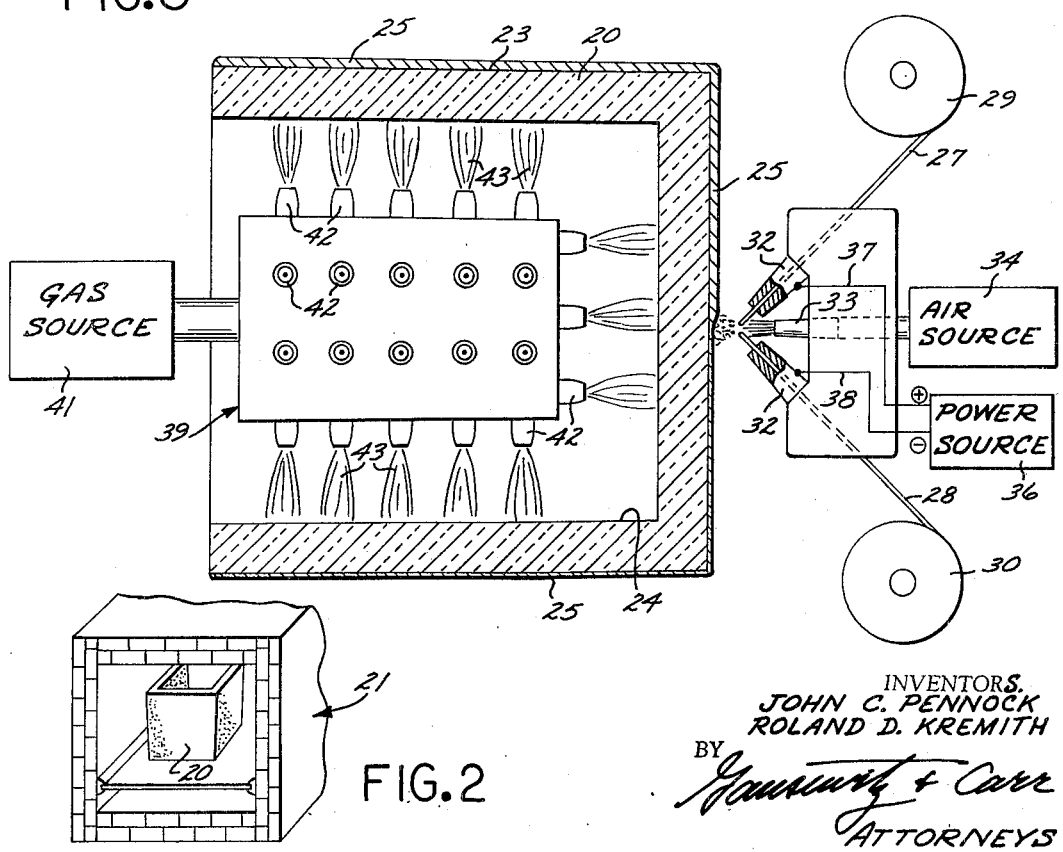
FIG.2
INVENTORS.
JOHN C. PENNOCK
ROLAND D. KREMITH
BY
ATTORNEYS United States Patent Office 3,506,057
Patented Apr. 14, 1970

3,506,057
METHOD OF MAKING DIES AND MOLDS
John C. Pennock, Santa Ana, and Roland D. Kremith, Newport Beach, Calif., assignors to Geotel, Inc., Amityville, N.Y., a corporation of Delaware
Filed Apr. 17, 1967, Ser. No. 631,351
Int. Cl. B22d 21/02
U.S. Cl. 164—19
15 Claims

ABSTRACT OF THE DISCLOSURE

The disclosure describes the manufacturing of a die, mold, or other article by building up on a substrate a spray-deposit of metal, while maintaining the deposited metal in a temperature range sufficiently high that the metal coating will be dense and will not peel away from the substrate. In the case of female dies, etc., the substrate is so constructed that it will be fractured by the metal due to thermal contraction of the latter after heating, thereby preventing the metal from cracking, and facilitating separation of the metal from the substrate, while maintaining the shrinkage of the metal part at a minimum. The spray-deposit is made by arc equipment, in an oxidizing atmosphere.

BACKGROUND OF THE INVENTION

Field of the invention

The field to which the present invention relates is that of making dies, molds, etc., by spray-depositing metal onto a substrate, and thereafter separating the metal from the substrate so that the metal surface which was in contact with the substrate then becomes the die or mold surface. Stated more definitely, the field is that of making dies, molds, etc., including dies for use at high pressures and, frequently, at high temperatures. Thus, the dies may be used for the hot-press forming of various metals (e.g., steel).

Description of the prior art

Many prior-art workers have attempted to make satisfactory dies, molds, etc., by spray-coating metal and/or other substances onto substrates. However, such prior-art processes were unsatisfactory and deficient in various respects, some of the deficiencies being briefly outlined in the following subparagraphs:

(1) The spray-deposited coating would crack, particularly where the coating was sufficiently thick to impart a high degree of strength to the mold or die.

(2) The spray-deposited coating would peel or lift away from the substrate during the spray-coating operation. Again, such peeling or lifting is particularly prevalent relative to thicker spray-deposited coatings such as are required for strong molds and dies. The peeling is especially difficult to prevent when the part is relatively large and/or has substantially planar surfaces.

(3) The separation of the sprayed-on coating from the substrate, after completion of the spraying operation, was difficult to accomplish and sometimes resulted in damage to the die or mold.

(4) Many processes were limited to low-temperature metals, which are characterized by insufficient hardness and heat resistance for numerous molding operations.

(5) Even in the case of dies formed of relatively high-temperature metals, the die surfaces were not sufficiently hard to withstand the wear inherent in long-run molding operations.

(6) The sprayed-on metal coatings were relatively porous, not having sufficient density to receive a good polish.

(7) Such additional steps as post-baking, heat treating, etc., were frequently required, and were sometimes necessitated in order to create chemical reactions between different substances applied to the substrate.

(8) Various processes required coating of the substrate in various and different ways, required the use of fluxes, or combinations of different metals, etc.

(9) Certain processes required that the substrates be roughened or otherwise treated in such manner as to detract from the characteristics of the interface between the sprayed-on metal coating and the substrate.

SUMMARY OF THE INVENTION

In accordance with one aspect of the present method the metal spray-deposited on a substrate is maintained at a high temperature throughout the continuance of the spray-coating operation, the temperature of the exposed surface of the metal being at least 1000 degrees F. Such heating has been found to prevent even relatively thick spray-coatings from peeling or lifting away from the substrate surface. A further major advantage is that the sprayed-on coating is dense, being capable of receiving a good polish. In accordance with another aspect of the present invention, the substrate adapted to form a female die is so constructed that it will be broken or fractured by the relatively thick sprayed-on metal coating during cooling of the latter after discontinuance of the heating operation. This provides at least three important effects, namely prevention of cracking of the thick coating, facilitation of the removal of the substrate from the metal, and minimization of the shrinkage of the metal during the cooling step. In accordance with another aspect of the invention, the spray-coating is a mild steel or other oxidizable substance which is spray-applied in an oxidizing atmosphere in order that dispersed oxides will be formed, thereby substantially increasing the hardness of the mold or die.

The present method solves the above-specified and other problems of the prior art, and forms a thick, hard, wear-resistant and temperature-resistant die having a smooth forming surface capable of receiving a good polish, the die being dense and (in the case of female dies) being characterized by dimensional changes during cooling which are sufficiently small that they are very easy to predict and compensate for.

BRIEF DESCRIPTION OF THE DRAWINGS

FIGURE 1 is an isometric view illustrating the casting of the substrate, portions being broken away to show various surfaces;

FIGURE 2 is an isometric view illustrating the heating of the substrate in an oven;

FIGURE 3 is a vertical sectional view showing the simultaneous spray-coating of the exterior surface of the substrate and heating of the interior surface thereof;

DESCRIPTION OF A PREFERRED EMBODIMENT

Figure 4:
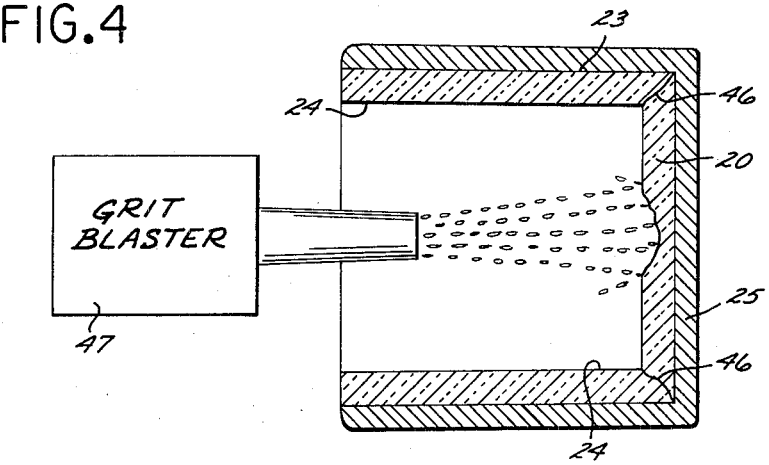
FIGURE 4 is a sectional view corresponding generally to FIGURE 3 but illustrating the condition of the substrate and the spray-coating after cooling, and during removal of the substrate from the metal.

Referring first to FIGURE 1, the first step in the method comprises providing a pattern or model which, in the case of a process for manufacturing a female mold or die, is a female element. Thus, in the illustration, the pattern or model is formed by four side elements 10–13 and a bottom element 14 all cooperating to define a generally rectangular cavity which is open at the upper end. The wall of such cavity (the interior surfaces of elements 10–14) is indicated at 16 and is the surface which it is desired to reproduce in the female die or mold (which die then will be used to form male surfaces). It is emphasized that the illustrated rectangular cavity is only exemplary, and that numerous complex or simple shapes and surfaces may be provided.

The second step in the method comprises conforming to the cavity wall 16 a substance (hereinafter termed the substrate) which has such characteristcs that it may be sprayed with metal in order to form a mold, die or other element made in accordance with the present method. At least the surface of the substrate must be capable of withstanding heating to a high temperature without decomposing. The substrate should, preferably, be characterized by relatively low shrinkage during and after casting. Fused silica cement is a desirable substance for this purpose. For example, a slip-cast fused silica cement which is marketed under the trademark "Glasrock" may be employed. Such cement is a castable, hydraulic setting material and is described in a book by J. D. Walton and N. E. Poulos, entitled "Special Report No. 43," published by the Engineering Experiment Station, Georgia Institute of Technology, Atlanta, Ga. In addition to the indicated slip-cast fused silica cement, various other substrate materials may be utilized. Thus, various ceramic substances may be employed.

The above-indicated slip-cast fused silica cement (or other suitable substrate substance) is mixed with water and introduced into the cavity defined by wall 16, following which a rectangular plug 18 (supported by a support member 19) is inserted into the cavity in order to cause the fused silica cement to assume the shape of a hollow-box substrate 20 which is open at one end. It is again emphasized that the hollow-box shape is only exemplary of numerous hollow (concave) substrates which could be employed. However, as will be described below, the thickness of the substrate may be one factor determining the strength or frangibility thereof.

It is to be understood that the substrate 20 may be cured by various techniques. Thus, for example, in the case of the indicated slip-cast fused silica cement described in such "Special Report No. 43," the as-cast material is allowed to set for approximately twenty-four hours while covered with a plastic covering adapted to retain most moisture, following which the substrate is permitted to set for an additional twenty-four hours. Thereafter, the plug 18 is pulled and substrate 20 is removed from the cavity and placed in an oven which is indicated at 21 in FIGURE 2. In such oven, or elsewhere, the substrate 20 is cured at 220 degrees F. for three days, being then dried at 350 degrees F. to 400 degrees F. for two days. It is emphasized that these values are merely exemplary, and that the time required to complete the substrate may be made drastically shorter than that indicated above.

The wall elements 10–14 and the plug 18 are, prior to introducing the moldable substrate material therein, coated with suitable release agents. As one example, the release means may comprise several coats of lacquer on wooden elements 10–14 and 18, the lacquer being then dried and coated with paste wax which is thereafter lightly dusted with boron nitride powder.

Referring next to FIGURE 3, the substrate 20 (which has been formed as described above relative to FIGURES 1 and 2) is shown as having an exterior (convex) surface 23 and an interior (concave) surface 24. Exterior surface 23 is a reproduction (or negative) of the above-indicated model or pattern surface 16 (the interior surfaces of elements 10–14). Correspondingly, inner surface 24 is a reproduction or negative of the surface of plug 18. In the illustrated embodiment, the plug surfaces and pattern surfaces are spaced relatively constant distances apart, so that the wall thickness of substrate 20 is substantially uniform.

The next step in the method comprises bringing the substrate 20, or at least the surface thereof adapted to be spray-coated, up to a predetermined temperature range to be specified below. Thus, the substrate 20 may be heated in the oven 21, for example, for a time period on the order of four hours and to a temperature in the range of 1600 degrees F. to 1800 degrees F. The indicated temperature is somewhat above the predetermined spray-coating range (to be stated below) for mild steel, this being because of the fact that a certain amount of cooling of the substrate occurs during the short period which elapses subsequent to removal from the oven 21 and prior to initiation of the spray-coating operation. It is pointed out that the heating of the substrate may also be effected in various other ways. However, the oven-heating step is advantageous in that it provides a uniform and relatively high temperature throughout the substrate 20.

Figure 5:
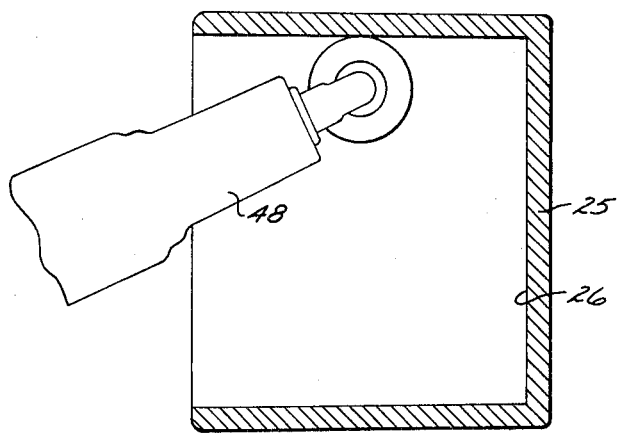
FIGURE 5 is a sectional view illustrating polishing of the mold or die surface.

The next step in the method comprises applying a thick spray-coating of metal onto the exterior surface 23 of substrate 20 while maintaining such metal coating in a predetermined temperature range (described below) which is: (a) adapted to prevent the metal from peeling or lifting away from the surface 23 despite the fact that the metal coating is relatively thick, and (b) adapted to cause densification of the spray-coating. The metal spray-coating is indicated at 25 and forms, as shown in FIGURE 5, a female die or mold element (illustrated as box-shaped in the present drawing) having an interior or concave surface 26 which is an accurate reproduction ("negative") of the exterior substrate surface 23.

The metal spray-coating 25 is applied (FIGURE 3) through use of an arc metallizing process wherein consumable metal wires are progressively arc-melted and then blown against the substrate surface 23 by means of a blast of air or other suitable gas. Stated more definitely, first and second consumable metal wires 27 and 28 supplied by reels 29 and 30 are fed through guides 32. The tips of the wires are located in proximity with each other and in the path of an air blast from a conduit 33 leading to a suitable air-pressure source 34. A supply 36 of electrical power, preferably D.C. power, is connected to the guides 32 (and thus to the wires 27 and 28) by means of conductors 37 and 38. The current from power source 36 causes melting of the tips of both wires by electric arc heating and also, during some intervals, by resistance heating, with resultant air-blasting of stripped molten particles of metal onto the substrate surface 23. Suitable means, not shown, are provided to feed the wires 27 and 28 at a rate correlated to the rate of melting of the wire tips.

During the indicated spraying operation, the temperature of the spray-applied coating is maintained in the predetermined temperature range, this being effected (for example) by continuously heating the substrate 20 as by means of a suitable torch apparatus. In the schematic representation of FIGURE 3, a multi-headed torch apparatus 39, supplied with gas (or gases) from a source 41, has a multiplicity of nozzles 42 which are directed against various portions of the interior surface 24 of substrate 20. For example, the apparatus 39 may be of the oxy-acetylene type. Preferably, each nozzle 42 is adapted to discharge a high-temperature effluent or jet 43 over a wide area of surface 24.

Continuous relative movement is effected between the apparatus 39 and the interior substrate surface 24 in order to effect uniform heating of the substrate, it being understood that the heat thus applied to interior surface 24 is conducted through the substrate 20 to the exterior surface 23 and thus to the coating 25 thereon.

Instead of or in addition to heating the interior surface 24, the exterior surface of the coating 25 may be heated directly. This may be done, for example, by locating oxy-acetylene torches outwardly of coating 25, while maintaining the the spacing (and/or the rate of relative movement) sufficiently great that the coating will not melt but will instead remain in the desired temperature range. Other heating means, including electrical induction heating means, may be employed.

The spray apparatus is manipulated around all five portions of the surface 23 to provide a relatively thin coating uniformly thereon, following which the operation is repeated until the coating is built up to the requisite wall thickness. Care should be taken to maintain the spray-applied coating in the necesary temperature range without, however, causing sufficient heating of the interface between coating 25 and substrate 20 to effect a reaction therebetween. Such a reaction, which may occur when the heat is excessive, causes a roughening of the interface with consequent damage to the female mold surface 26 (FIGURE 5) which it is desired to achieve.

The application of the spray-coating onto the substrate surface 23 is preferably effected as rapidly as possible, there being a relatively rapid relative movement between the metallizing apparatus and the substrate.

After conclusion of the spray-coating operation, the substrate 20 and coating 25 are cooled to ambient. This may be effected relatively slowly, for example at a rate of 200 degrees F. per hour. Also, if desired, the substrate 20 and coating 25 may be oven-heated (for example, to 1800 degrees F.) before cooling is initiated.

During cooling, the metal coating 25 contracts slightly and, in accordance with one major feature of the present invention, effects fracture or crushing of the substrate 20 (which is frangible). For example, and as shown in FIGURE 4, cracks 46 are formed in corner (and/or other) portions of the substrate 20 due to the contraction of the metal coating 25. The cracking of the substrate 20 in response to thermal contraction of coating 25 causes a reduction in the size of the substrate (in the present example, in the size of the box). This, therefore, relieves the stresses in the coating 25 to an extent sufficient to prevent the coating from cracking.

The next step comprises removing the substrate 20 to expose the female mold or die surface 26. Particularly because of the formation of the cracks 46, or other cracks, it is frequently possible to remove large portions of the substrate 20 by means of a hammer. Additionally or alternatively thereto, a grit blaster 47 (using, for example, 40 mesh chilled iron grit) may be employed to remove the substrate 20. The substrate material, such as the above-specified fused silica cement, is readily removed by means of a grit blaster. However, the die surface 26 is not deleteriously affected by the grit blaster to any material extent.

The next step in the method comprises polishing the female die or mold surface 26, for example by means of the polishing apparatus represented schematically at 48. It has been found that the amount of polishing required is relatively small, and that the die surface 26 is an accurate and faithful reproduction of the substrate surface 23 which, in turn, is an accurate reproduction of the interior surface 16 of the model or pattern.

A description of the over-all process having been given above, there will next be described various relationships, etc., many of which are of critical importance to the invention.

A first critical relationship is that, as indicated above, the spray-applied coating 25 must be maintained in a predetermined relatively high temperature range during the continuance of the spray-coating operation. One purpose of thus heating the coating 25 is to prevent it from peeling or lifting away from the surface 23. Such peeling or lifting is especially pronounced (in the absence of appropriate heating of the substrate) as the coating thickness is increased. A second purpose of maintaining the coating 25 at a high temperature is to cause densification thereof.

The coating 25 is therefore maintained at a temperature sufficiently high to prevent the above-indicated peeling or lifting of the coating away from the substrate, and to effect densification, but sufficiently low to prevent melting of the coating and also to prevent the previously-mentioned adverse reaction at the interface between coating and substrate.

Stated more definitely, the coating temperature should be maintained sufficiently high that the temperature of the exposed surface of coating 25 (adjacent the spray-coating apparatus) is at least about 1000 degrees F. where the coating metal is of the desired temperature-resistant and wear-resistant type such as mild steel, stainless steel, various ferrous alloys, etc. In the case of mild steel, such as (for example) when the consumable wires 27 and 28 are formed of the low carbon steel SAE 1010, the temperature of the entire surface of the coating 25 should be such that it is a dark red, in the range of about 1100 degrees F. to about 1200 degrees F.

Factors such as the time delay following removal of the substrate 20 from the oven 21, and the rate of relative movement between the spray torch apparatus and the substrate, should be controlled in such manner that the exposed coating surface does not reach the bright cherry red range since this may (for substrates such as the above-specified fused silica cement) provide the indicated harmful reaction at the interface. However, for other and more temperature-resistant substrates, higher temperatures (but below the melting point of the coating) are sometimes desirable. It is pointed out that, although the air from source 34 is at room temperature, the molten droplets transmitted from the torch to the substrate are (for many coatings) initially at a temperature in excess of 2000 degrees F. which may, unless there is a sufficient rate of traverse between the torch and the substrate, create excessive localized heating of the previously-deposited coating.

As indicated above, the density of the coating has been found to be very much higher, in the case of a coating substance applied to a substrate (or previously-deposited coating) in the indicated temperature range, than in the case of coating substances applied to substrates (or previously-deposited coatings) which are at room temperature or are otherwise far below the indicated temperature range. A high-density coating is important relative to such factors as wear, strength, ability to take a good polish, resistance to cracking, etc.

A second critical relationship, and which is particularly relevant to the formation of a female or concave mold 25, is that the substrate 20 is so composed and constructed that it will crush or break as the metal coating 25 cools. Stated more definitely, the substrate 20 is so composed and constructed that it will resist thermal shrinkage of the metal coating 25, and thereby maintain the shrinkage of such coating at a minimum, but will nevertheless ultimately crack or break to thereby prevent cracking or breaking of the coating 25. Several important results are thus achieved, including the following: (1) Coating 25 may be made thick, yet will not crack during cooling despite that fact that the substrate 20 may be large and characterized by the presence of planar surfaces, and (2) cracking or breaking of the substrate 20 facilitates removal thereof from the spray-formed die or mold.

In addition, and as indicated above, the substrate 20 is preferably caused to have a strength sufficient to provide a substantial initial resistance to shrinkage of the coating 25 without, however, being sufficiently strong to cause failure or distortion of any part of such coating. This factor maintains the dimensional stability of the coating 25 at a maximum, and facilitates achieving a female die having a surface 26 (FIGURE 5) which is an accurate reproduction of the model or pattern surface reproduced thereby (namely the model or pattern surface 16 described in connection with FIGURE 1).

The substrate 20 may be made sufficiently weak (that is to say, caused to be in the desired strength range) in an empirical manner, or stress analysis may be employed to compare the strength of the substrate 20 to that of a coating 25 of the desired thickness. It is also pointed out that points of weakness, stress risers, saw cuts, etc., may be incorporated in the substrate at various locations in order to increase and localize (when desired) the regions of breakage.

As one example, a substrate 20 formed of the above-described "Glasrock" fused silica cement was employed to form a mild steel die 25 having a thickness on the order of ⅜ inch to ½ inch. For such a die, the substrate was caused to have a uniform thickness of ½ inch. The size of each face of the substrate (surface 23) was 5 inches by 5 inches. When the substrate 20 of the indicated size and thickness was employed to form the mild steel coating 25 (for example, SAE 1010), the fracture of the substrate occurred upon cooling, and no cracks formed in the coating or die 25. On the other hand, in an identical situation except that the wall thickness of the substrate was increased to ¾ inch, the die 25 cracked upon cooling whereas the substrate did not.

Figure 6:
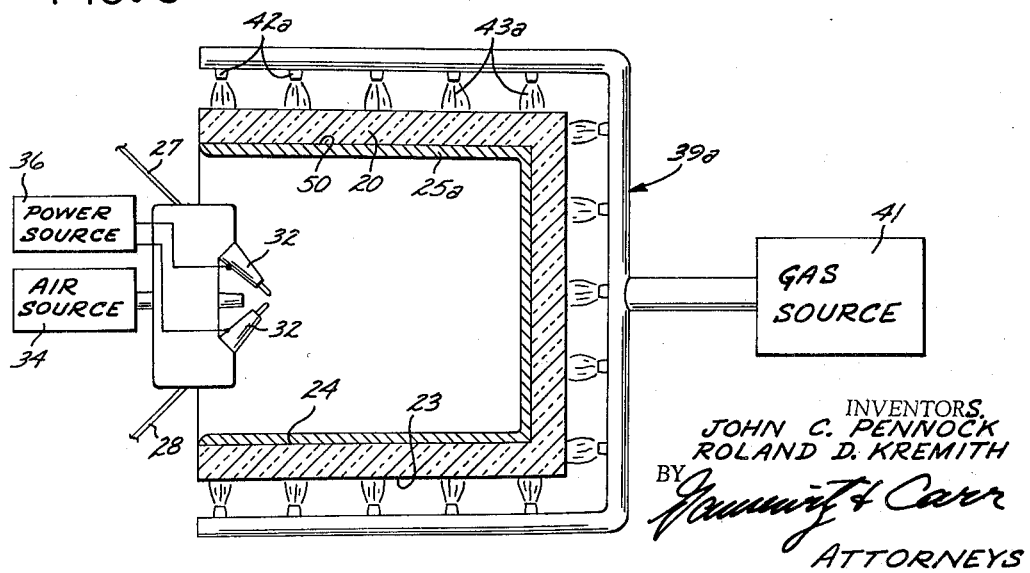
FIGURE 6 is a sectional view corresponding generally to FIGURE 3 but illustrating a second embodiment, wherein the die or mold is male instead of female.

The resistance presented by the substrate 20 to shrinkage of the coating 25 is evidenced by the fact that the female die 25 exhibits much less shrinkage than do comparable male dies (which are formed as will be described relative to FIGURE 6). This is because the female die, when it tends to shrink, is restrained by the substrate 20 whereas the male die is unrestrained during shrinkage. It is pointed out, however, that the die dimensions can be predicted and controlled even in the case of male dies (although the prediction and control is much simpler in the case of female dies because of the above-stated minimum dimensional changes).

The present method, particularly the portion thereof which relates to the manufacture of female dies and molds, etc., contemplates the use of frangible substrates which are non-metallic, and are capable of being sprayed at high temperatures. Furthermore, such substrates are characterized by coefficients of thermal expansion which are lower than those of the metal coatings applied thereto. Therefore, as stated in detail above, the metal coating will contract more than will the substrate upon discontinuance of heating, thus causing the indicated fracture of the substrate by the contracting metal.

It is pointed out that the non-metallic substrate materials described herein are relatively porous, and inexpensive to manufacture, form and remove. Furthermore, they are readily constructed in such manner that the requisite substrate failure will occur during cooling of the metal coating, thereby preventing failure of the coating itself.

It is emphasized that relatively thick-walled dies are necessary in order that they may be handled without bending or breakage, and in order that they may withstand the stresses and the wear inherent in various forming and molding operations, especially hot-forming operations. In accordance with the present invention, the dies may be made relatively thick, without peeling away from the substrates, because of the above-specified maintaining of the substrates and coatings in the predetermined temperature range during the continuance of the spray-coating operations. Furthermore, and because the dies are thick, the substrates may also be made relatively thick without being so strong that cracking of the coatings or dies will occur during thermal shrinkage. Relatively thick substrates are thus made possible, which is desired in that extremely thin substrates are difficult to cast and handle.

An important feature of the present method is that it will produce a mild steel die, for example, having a relatively hard and wear-resistant die surface 26 (FIGURE 5). It has been found that the spray application of the mild steel from wires 27 and 28 (FIGURE 3), in the presence of air from source 34, creates a spray-coating 25 which is characterized by the inclusion of dispersed iron oxides which increase the hardness of the die surface 26. Thus, the die has wear capabilities which are greater than in the case of mild steel applied by other processes. Mild steel has been found to be particularly advantageous as a die material for the present process, it being understood, however, that other metals and metal alloys (particularly ferrous) may be utilized as indicated above.

Although the die 25 is caused to be sufficiently thick that it may be employed where high strength is necessary, for example in the hot-press forming of steel, it is pointed out that the die is not so thick that it requires substantial amounts of metal, or is excessively heavy. In his respect, the dies formed by the present invention are superior to dies which are carved out of masses of metal.

The dies of the present invention may be backed up in various ways in order to increase the over-all rigidity of the die surfaces. The backup means may include frames, substances employed behind the dies, substances cast around the dies, etc.

The spray-coating apparatus illustrated and described relative to FIGURE 3 may be used, for example, with the following operating parameters in order to spray-deposit the indicated mild steel wires 27 and 28: Operating current, 250 amperes; operating voltage, 26 volts; atomizing air pressure, 45 p.s.i. gauge; spray distance between the wire tips and the substrate, 8 to 10 inches; wire diameter, $\frac{1}{16}$ inch. In connection with the spray distance, it is pointed out that the showing of FIGURE 3 is not in proportion in that the spray torch is normally farther from the substrate than is there illustrated.

EMBODIMENT OF FIGURE 6

The present invention is particularly adapted to the manufacture of female molds, dies, etc. However, certain aspects of the invention are applicable to the manufacture of male dies and other elements, as will next be described relative to FIGURE 6.

The substrate 20, manufactured as described in detail above, is pre-heated as stated heretofore and then sprayed through use of the described apparatus in order to form the coating 25a. However, the coating 25a is applied to the interior surface 24 of the substrate instead of to the exterior surface 23 thereof. During the continuance of the spray-coating operation, the spray-deposited coating is maintained in the desired temperature range, for example by means of the apparatus 39a which corresponds to the apparatus 39 except that it is adapted to heat the entire exterior of the substrate 20 instead of the interior thereof. Also, as stated heretofore, the coating may be heated directly.

After the deposit 25a has been built up to the desired thickness, and allowed to cool, it is removed from the substrate 20 in order that the exterior surface 50 thereof may serve as a male die, for example. The surface 50 is polished as described relative to FIGURE 5.

When the deposited metal 25a cools, it shrinks away from interior surface 24 of substrate 20, so that the substrate does not normally crack. As stated above, the amount of shrinkage of the coating 25a is substantially greater than the amount of shrinkage of the above-indicated coating 25.

The words "concave" and "convex" are used in this specification and claims in a very broad sense, respectively denoting "depressed" and "bulging or protuberant." The words do not necessarily imply roundness or sphericity, applying also to surfaces having flat surfaces or portions.

The foregoing detailed description is to be clearly understood as given by way of illustration and example only, the spirit and scope of this invention being limited solely by the appended claims.

What is claimed is:

1. A method of manufacturing a female mold, die, or other article, which comprises:

providing a male substrate having an exterior surface which it is desired to reproduce in a female die, mold, or other article, said substrate having a relatively low coefficient of thermal expansion, said substrate being adapted to fracture in response to thermal contraction of a thick spray-coating deposited on said exterior surface, thus preventing cracking of said coating, hot spray-depositing onto said exterior surface a relatively thick coating of metal having a relatively high coefficient of thermal expansion, said deposited coating being sufficiently hot that it is in expanded condition, effecting cooling of said deposited coating to thus cause thermal contraction thereof and consequent fracture of said substrate, and removing said substrate from said deposited coating to thus expose the interior surface of said coating.

2. The invention as claimed in claim 1, in which said method further comprises effecting heating of said deposited coating during the continuance of said spray-coating operation, thereby not only maintaining said coating in expanded condition but also preventing peeling of the deposited metal and effecting densification thereof.

3. The invention as claimed in claim 2, in which said heating step maintains the temperature of said coating in excess of 1000 degrees F.

4. The invention as claimed in claim 2, in which said coating is mild steel, and in which said heating step maintains the temperature of said coating in the range of about 1100 degrees F. to about 1200 degrees F.

5. The invention as claimed in claim 2, in which said method further comprises employing a hollow substrate, and applying heat to the interior surface of said substrate during spray-depositing of said coating onto the exterior surface thereof.

6. The invention as claimed in claim 2, in which said substrate is a fused silica cement.

7. The invention as claimed in claim 1, in which said method comprises making said substrate sufficiently strong to resist said thermal contraction of said coating and thus minimize the dimensional changes in said coating, but sufficiently weak that said substrate will reduce in size and thus prevent cracking of said coating.

8. A method of forming a temperature-resistant high-pressure female mold or die, which comprises:

providing a castable, hydraulic setting material, providing a female pattern or model having an interior surface corresponding to the desired mold or die surface, employing said castable material and said pattern or model to form a hollow substrate having an exterior convex surface and an interior concave surface, said last-named step being so performed that said substrate will resist thermal contraction of a thick metal coating sprayed on said exterior surface but will fracture in response to such thermal contraction and thereby prevent cracking of said coating, hot spray-coating onto said exterior surface a thick coating of a metal having a melting point greatly higher than 1000 degrees F., maintaining the exposed surface of said metal coating in a predetermined temperature range during said spray-coating step, said predetermined temperature range being higher than 1000 degrees F. but lower than the melting point of said metal, effecting cooling of said coating to thus cause said thermal contraction thereof and consequent fracture of said substrate, and separating said substrate from said metal, thereby exposing an interior surface which is the negative of said exterior surface of said substrate.

9. The invention as claimed in claim 8, in which said metal is mild steel, and in which said predetermined temperature range is about 1100 degrees F. to about 1200 degrees F.

10. The invention as claimed in claim 9, in which said spray-coating step is effected in an oxidizing atmosphere.

11. The invention as claimed in claim 8, in which said spray-coating step is effected by means of an electric-arc metal-spray apparatus wherein said metal is present in the form of two wires which are progressively melted by maintaining an arc therebetween, and in which a stream of air is provided to propel the resulting molten particles of said metal against said exterior surface.

12. The invention as claimed in claim 8, in which said hydraulic setting material is slip-cast fused silica cement.

13. The invention as claimed in claim 8, in which said method comprises maintaining said metal coating in said predetermined temperature range by applying heat to said interior surface of said substrate while said exterior surface thereof is spray-coated.

14. The invention as claimed in claim 8, in which said method further comprises heating said spray-coated substrate, after completion of spray-coating, to a temperature above said predetermined temperature range, and thereafter slowly cooling said spray-coated substrate over a period of many hours.

15. The invention as claimed in claim 8, in which said method further comprises polishing said interior surface of said metal.

References Cited

UNITED STATES PATENTS

| | | | |
|---|---|---|---|
| 2,250,246 | 7/1941 | Axline | 164—19 X |
| 2,258,451 | 10/1941 | Ingram | 164—19 |
| 2,293,062 | 8/1942 | Ingram | 164—19 X |
| 1,813,880 | 7/1931 | Kraft | 164—19 |
| 2,280,864 | 4/1942 | Stossel | 164—19 |
| 2,280,866 | 4/1942 | Stossel | 164—19 |
| 2,293,571 | 8/1942 | Stossel | 164—14 |
| 2,966,423 | 12/1960 | Shichman | 117—46 |

J. HOWARD FLINT, JR., Primary Examiner

J. S. BROWN, Assistant Examiner

U.S. Cl. X.R.

164—46